US012556660B1

(12) United States Patent
Gate et al.

(10) Patent No.: US 12,556,660 B1
(45) Date of Patent: Feb. 17, 2026

(54) AUTONOMOUS VEHICLE TELEOPERATIONS SYSTEM

(71) Applicant: Aurora Operations, Inc., Mountain View, CA (US)

(72) Inventors: Gwennael Herve Jonathan Gate, Pittsburgh, PA (US); Dmitriy Kislovskiy, Pittsburgh, PA (US); Narek Melik-Barkhudarov, Edgewood, CA (US); Nathaniel Gist, IV, Pittsburgh, PA (US)

(73) Assignee: Aurora Operations, Inc., Mountain View, CA (US)

( * ) Notice: Subject to any disclaimer, the term of this patent is extended or adjusted under 35 U.S.C. 154(b) by 326 days.

(21) Appl. No.: 18/102,018

(22) Filed: Jan. 26, 2023

Related U.S. Application Data

(63) Continuation of application No. 16/918,519, filed on Jul. 1, 2020, now Pat. No. 11,595,619.

(Continued)

(51) Int. Cl.
*H04N 7/18* (2006.01)
*G05D 1/00* (2006.01)
(Continued)

(52) U.S. Cl.
CPC ........... *H04N 7/181* (2013.01); *G05D 1/0022* (2013.01); *G05D 1/0038* (2013.01);
(Continued)

(58) Field of Classification Search
CPC .... H04N 7/181; G05D 1/0022; G05D 1/0038; G05D 1/0061; H04L 65/80; H04W 4/40
(Continued)

(56) References Cited

U.S. PATENT DOCUMENTS

| | | | |
|---|---|---|---|
| 8,761,498 B1 * | 6/2014 | Wu | G06V 20/10 |
| | | | 382/203 |
| 9,507,346 B1 | 11/2016 | Levinson et al. | |

(Continued)

FOREIGN PATENT DOCUMENTS

| | | | |
|---|---|---|---|
| CA | 3120270 | | 12/2021 |
| CN | 109427202 | * | 3/2019 |
| CN | 110531752 | * | 12/2019 |

OTHER PUBLICATIONS

United States Patent and Trademark Office, Non-Final Office Action for U.S. Appl. No. 16/918,525, 29 pages, dated May 12, 2022.
(Continued)

*Primary Examiner* — Muhammad Shafi
(74) *Attorney, Agent, or Firm* — Gray Ice Higdon

(57) ABSTRACT

A teleoperations system may be used to selectively override conditions detected by an autonomous vehicle to enable the autonomous vehicle to effectively ignore detected conditions that are identified as false positives by the teleoperations system. Furthermore, a teleoperations system may be used to generate commands that an autonomous vehicle validates prior to executing to confirm that the commands do not violate any vehicle constraints for the autonomous vehicle. Still further, an autonomous vehicle may be capable of dynamically varying the video quality of one or more camera feeds that are streamed to a teleoperations system over a bandwidth-constrained wireless network based upon a current context of the autonomous vehicle.

18 Claims, 9 Drawing Sheets

Related U.S. Application Data

(60) Provisional application No. 63/033,415, filed on Jun. 2, 2020.

(51) Int. Cl.
*H04L 65/80* (2022.01)
*H04W 4/40* (2018.01)

(52) U.S. Cl.
CPC .......... *G05D 1/0061* (2013.01); *H04L 65/80* (2013.01); *H04W 4/40* (2018.02)

(58) Field of Classification Search
USPC .......................................................... 701/2
See application file for complete search history.

(56) References Cited

U.S. PATENT DOCUMENTS

| | | |
|---|---|---|
| 10,077,007 B2 | 9/2018 | Meyhofer et al. |
| 10,201,014 B2 | 2/2019 | Kadous et al. |
| 10,528,818 B1 | 1/2020 | Rao et al. |
| 10,780,880 B2 | 9/2020 | Wood et al. |
| 10,884,424 B2 | 1/2021 | Creusot |
| 10,921,817 B1 | 2/2021 | Kangaspunta |
| 10,976,732 B2 | 4/2021 | Lockwood |
| 11,016,485 B2 | 5/2021 | Pedersen et al. |
| 2012/0316763 A1 | 12/2012 | Haynes, III et al. |
| 2015/0248131 A1 | 9/2015 | Fairfield et al. |
| 2018/0208188 A1* | 7/2018 | Williams ................ B60R 11/04 |
| 2018/0281815 A1 | 10/2018 | Stentz |
| 2018/0364704 A1 | 12/2018 | Liu |
| 2019/0011910 A1* | 1/2019 | Lockwood ........... G05D 1/0038 |
| 2019/0042859 A1 | 2/2019 | Schubert et al. |
| 2019/0272433 A1 | 9/2019 | Yu |
| 2019/0286151 A1 | 9/2019 | Palanisamy et al. |
| 2019/0354111 A1 | 11/2019 | Chen |
| 2020/0132488 A1 | 4/2020 | Slutskyy |
| 2020/0142417 A1 | 5/2020 | Hudecek |
| 2020/0175326 A1 | 6/2020 | Shen |
| 2020/0183394 A1 | 6/2020 | Lockwood et al. |
| 2020/0284883 A1 | 9/2020 | Ferreira et al. |
| 2020/0307568 A1 | 10/2020 | Takahashi |
| 2020/0356090 A1 | 11/2020 | Thakur |
| 2020/0409352 A1 | 12/2020 | Caldwell |
| 2020/0409368 A1 | 12/2020 | Caldwell |
| 2021/0042535 A1 | 2/2021 | Abbott |
| 2021/0078602 A1 | 3/2021 | Wray et al. |
| 2021/0097304 A1 | 4/2021 | Agrawal |
| 2021/0116907 A1 | 4/2021 | Altman |
| 2021/0300422 A1 | 9/2021 | McGill et al. |
| 2021/0325880 A1 | 10/2021 | Gogna |

OTHER PUBLICATIONS

United States Patent and Trademark Office, Non-Final Office Action for U.S. Appl. No. 16/918,528, 36 pages, dated Jun. 17, 2022.

Canadian Patent Application No. 3,120,270 titled Autonomous Vehicle Teleoperations System dated May 31, 2021.

U.S. Appl. No. 16/918,525 titled Autonomous Vehicle Remote Teleoperations System dated Jul. 1, 2020.

U.S. Appl. No. 16/918,528 titled Autonomous Vehicle Teleoperations System dated Jul. 1, 2020.

* cited by examiner

AUTONOMOUS VEHICLE TELEOPERATIONS SYSTEM

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

It has also been proposed to utilize teleoperations to complement vehicle autonomy, particularly for use in connection with handling certain irregular conditions that an autonomous vehicle may encounter within an environment. Events such as construction-related lane or road closures, funeral processions, emergency vehicles, loading or unloading school buses, crossing guards, police officers directing traffic, etc., while potentially uncommon, will still inevitably be encountered by autonomous vehicles from time to time, thus requiring autonomous vehicles to handle such events in a safe and reliable manner. With teleoperations, a remote system or operator may be placed in communication with an autonomous vehicle to assist with resolving any such events, and as such, it is desirable for a teleoperations system to efficiently and reliably support teleoperations for autonomous vehicles.

SUMMARY

The present disclosure is related to facilitating interaction between an autonomous vehicle and a teleoperations system. A teleoperations system may be used in some implementations to selectively override conditions detected by an autonomous vehicle to enable the autonomous vehicle to effectively ignore detected conditions that are identified as false positives by a teleoperations system operator. Furthermore, a teleoperations system may be used in some implementations to generate commands that an autonomous vehicle validates prior to executing to confirm that the commands do not violate any vehicle constraints for the autonomous vehicle. Still further, an autonomous vehicle in some implementations may be capable of dynamically varying the video quality of one or more camera feeds that are streamed to a teleoperations system over a bandwidth-constrained wireless network based upon a current context of the autonomous vehicle.

Therefore, consistent with one aspect of the invention, a method may include detecting a condition with a detector in an autonomous vehicle operating in an environment, communicating a notification of the detected condition to a teleoperations system in communication with and remote from the autonomous vehicle, communicating to the teleoperations system context data collected by the autonomous vehicle from the environment in which the autonomous vehicle is operating and from which the detected condition may be verified by the teleoperations system, receiving from the teleoperations system an override command initiated in response to an inability to verify the detected condition, and causing the autonomous vehicle to ignore the detected condition in response to the received override command.

Also, in some implementations, causing the autonomous vehicle to ignore the detected condition includes causing the autonomous vehicle to operate as if the condition was not or is not detected. In some implementations, the detector is a high recall detector biased to reduce false negative detections and increase a likelihood of false positive detections, and the teleoperations system is configured to identify false positive detections by the detector. In addition, in some implementations, the detector is resident in a perception component of the autonomous vehicle. Also, in some implementations, the detector includes a construction detector configured to detect a lane blockage, lane construction, a temporary traffic control device, or an authority directing traffic. In some implementations, the detector includes an emergency vehicle detector configured to detect an emergency vehicle responding to an emergency situation, a school bus detector configured to detect a school bus with an extended stop arm, or a funeral procession detector configured to detect a funeral procession. Moreover, in some implementations, the detector includes a map change detector configured to detect a change in sensed data relative to mapping data. In some implementations, the detector includes an indecision detector configured to detect a condition where the vehicle is unable to determine any suitable paths forward or a rider request detector configured to detect when an individual is attempting to hail the autonomous vehicle. Also, in some implementations, communicating the context data to the teleoperations system includes communicating autonomy, sensor, telemetry and/or video data to the teleoperations system.

Consistent with another aspect of the invention, a method may include, in a teleoperations system in communication with an autonomous vehicle operating in an environment and remote from the teleoperations system, receiving from the autonomous vehicle a notification of a condition detected by a detector of the autonomous vehicle, in the teleoperations system, presenting to a teleoperations system operator context data collected by the autonomous vehicle from the environment in which the autonomous vehicle operates and from which the detected condition may be verified, in the teleoperations system, receiving an override command from the teleoperations system operator based upon an inability by the teleoperations system operator to verify the detected condition, and communicating the override command to the autonomous vehicle to cause the autonomous vehicle to ignore the detected condition.

Moreover, in some implementations, communicating the override command to the autonomous vehicle to cause the autonomous vehicle to ignore the detected condition causes the autonomous vehicle to operate as if the condition was not or is not detected. Further, in some implementations, the detector is a high recall detector biased to reduce false negative detections and increase a likelihood of false positive detections, and the override command indicates that the teleoperations system operator has identified a false positive detection by the detector. In addition, in some implementations, presenting the context data to the teleoperations system operator includes generating a user interface that represents at least a portion of the context data and that includes a user interface control that is actuatable by the teleoperations system operator to generate the override command. Further, in some implementations, the user interface control includes a slider control.

In some implementations, the detector includes a trained machine learning model, and the method further includes generating training data for the detector in response to receiving the override command. In addition, some implementations may also include notifying another autonomous vehicle in response to receiving the override command to cause the other autonomous vehicle to ignore a detected condition detected by a detector of the other autonomous vehicle.

Consistent with another aspect of the invention, a method may include receiving a plurality of camera feeds from a plurality of cameras disposed on an autonomous vehicle that is in communication with a remote teleoperations service over a wireless network, dynamically varying a video quality of at least one of the plurality of camera feeds based upon a current context of the autonomous vehicle, where dynamically varying the video quality of the at least one of the plurality of camera feeds includes reducing a video quality and a data usage rate of a first camera feed of the plurality of camera feeds relative to a second camera feed of the plurality of camera feeds based upon the first camera feed having less relevance to the current context of the autonomous vehicle than the second camera feed, and streaming the plurality of camera feeds to the teleoperations system over the wireless network, including streaming the first camera feed at the reduced video quality and data usage rate to reduce an overall data usage rate of the plurality of camera feeds.

Some implementations may further include detecting a condition associated with the autonomous vehicle and notifying the teleoperations system of the condition, and dynamically varying the video quality of the at least one of the plurality of camera feeds is based on the detected condition. Moreover, in some implementations, the condition is associated with a direction relative to the autonomous vehicle, and dynamically varying the video quality of the at least one of the plurality of camera feeds is based on the direction relative to the autonomous vehicle. In addition, in some implementations, the condition is associated with a distance relative to the autonomous vehicle, and dynamically varying the video quality of the at least one of the plurality of camera feeds is based on the distance relative to the autonomous vehicle. In addition, some implementations may further include dynamically selecting the second camera feed as a primary camera feed based upon the second camera feed having greater relevance to the detected condition than the first camera feed.

Further, in some implementations, reducing the video quality and the data usage rate of the first camera feed includes controlling a resolution, a frame rate, a field of view, a zoom, a color depth or a compression level for the first camera feed. Some implementations may also include receiving input from the teleoperations service, and dynamically changing a video quality of at least one of the plurality of camera feeds based upon the received input. In addition, some implementations may further include receiving input from the teleoperations service, and dynamically changing a primary camera feed from the plurality of camera feeds based upon the received input.

Consistent with another aspect of the invention, a method may include, in an autonomous vehicle operating in an environment, initiating a teleoperations session with a teleoperations system that is remote from the autonomous vehicle, communicating to the teleoperations system context data collected by the autonomous vehicle from the environment in which the autonomous vehicle operates, receiving a command from the teleoperations system in response to the context data, validating the command received from the teleoperations system in the autonomous vehicle, in response to successful validation of the command by the autonomous vehicle, executing the command in the autonomous vehicle, and in response to unsuccessful validation of the command by the autonomous vehicle, rejecting the command in the autonomous vehicle.

In addition, in some implementations, initiating the teleoperations session is performed in response to detecting a condition associated with the autonomous vehicle. In some implementations, initiating the teleoperations session is automatically performed when the autonomous vehicle is determined to be proximate to a predetermined geographical location. Also, in some implementations, the autonomous vehicle is a first autonomous vehicle, and initiating the teleoperations session is performed in response to detection of a condition by a second autonomous vehicle. Moreover, in some implementations, the condition is detected at a particular geographical location, and initiating the teleoperations session is performed when the first autonomous vehicle is determined to be proximate to the particular geographical location to enable the teleoperations system to assess whether the condition detected by the second autonomous vehicle still exists.

In addition, in some implementations, validating the command includes determining whether the path violates any constraint associated with the autonomous vehicle. In some implementations, the command directs the autonomous vehicle to follow a path, and validating the command includes determining whether the path violates any boundary defined in mapping data used by the autonomous vehicle. Moreover, in some implementations, the command directs the autonomous vehicle to follow a path, and validating the command includes determining whether executing the path violates any perception constraint for the autonomous vehicle.

In some implementations, rejecting the command in the autonomous vehicle includes delaying execution of the command in the autonomous vehicle until the command is determined to not violate any vehicle constraint associated with the autonomous vehicle. In addition, some implementations may further include, in response to unsuccessful validation of the command by the autonomous vehicle, communicating a notification to the teleoperations service. In some implementations, communicating the context data to the teleoperations system includes communicating autonomy, sensor, telemetry and/or video data to the teleoperations system.

Some implementations may also include a system that is remotely located from an autonomous vehicle and includes one or more processors that are configured to perform various of the methods described above. Some implementations may also include an autonomous vehicle control system including one or more processors, a computer readable storage medium, and computer instructions resident in the computer readable storage medium and executable by the one or more processors to perform various of the methods described above. Still other implementations may include a non-transitory computer readable storage medium that stores computer instructions executable by one or more processors to perform various of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed to a teleoperations system for use with an autonomous vehicle. Prior to a discussion of these implementations, however, an example hardware and software environment within which the various techniques disclosed herein may be implemented will be discussed.

Hardware and Software Environment

Figure 1:
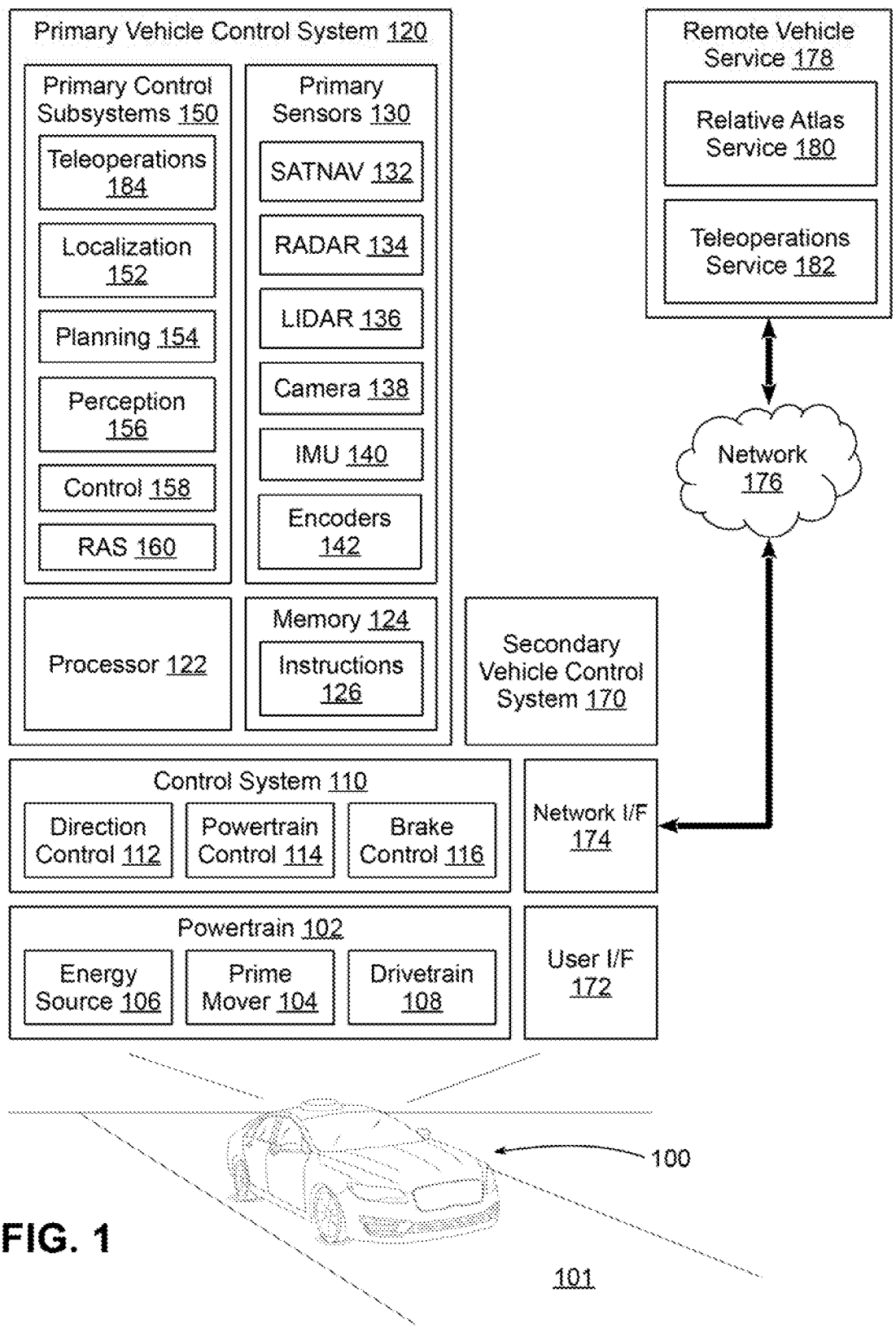
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a digital camera 138 (which may include various types of image capture devices capable of capturing still and/or video imagery), may be used to sense stationary and moving objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a path of motion for vehicle 100 over some timeframe given a desired destination as well as the static and moving objects within the environment, while perception subsystem 156 is principally responsible for detecting, tracking and/or identifying elements within the environment surrounding vehicle 100. Control subsystem 158 is principally responsible for generating suitable control signals for controlling the various controls in control system 110 in order to implement the planned path of the vehicle. Any or all of localization subsystem 152, planning subsystem 154, perception subsystem 156, and control subsystem 158 may have associated data that is generated and/or utilized in connection with the operation thereof, and that which may be communicated to a teleoperations system in some implementations.

In addition, a Relative Atlas Subsystem (RAS) 160 may be provided in the illustrated implementations to describe the elements within an environment and the relationships therebetween. RAS 160 may be accessed by each of the localization, planning and perception subsystems 152-156 to obtain various information about the environment for use in performing their respective functions. RAS 160 may be used to provide mapping data to the autonomous vehicle control system, which may be used for various purposes in an autonomous vehicle, including for localization, planning, and perception, among other purposes. Mapping data may be used, for example, to lay out or place elements within a particular geographical area, including, for example, elements that represent real world objects such as roadways, boundaries (e.g., barriers, lane dividers, medians, etc.), buildings, traffic devices (e.g., traffic signs, lights, etc.), as well as elements that are more logical or virtual in nature, e.g., elements that represent valid pathways a vehicle may take within an environment (referred to hereinafter as "gates"), "virtual" boundaries such as lane markings, or elements that represent logical collections or sets of other elements. Mapping data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In the illustrated implementation, RAS 160 may provide mapping data in a format in which the positions of at least some of the elements in a geographical area are defined principally based upon relative positioning between elements rather than any absolute positioning within a global coordinate system. It will be appreciated, however, that other atlas or mapping systems suitable for maintaining mapping data for use by autonomous vehicles may be used in other implementations, including systems based upon absolute positioning, so the invention is not limited to use with the particular relative atlas system disclosed herein. Furthermore, it will be appreciated that at least some of the mapping data that is generated and/or utilized by RAS 160 may be communicated to a teleoperations system in some implementations.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 178 including, at least for the purposes of implementing various functions described herein, a relative atlas service 180 and a teleoperations service 182. Relative atlas service 180 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Teleoperations service 182 may be used, for example, to provide teleoperations support to vehicle 100, e.g., through communication with a teleoperations subsystem 184 resident in primary vehicle control system 120, as will be discussed in greater detail below.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Teleoperations System

Operating an autonomous vehicle in the complex and dynamic environments within which automobiles regularly operate often necessitates handling a diverse array of conditions that, while comparatively uncommon, are still regularly encountered by many autonomous vehicles over time. Autonomously handling these uncommon conditions in both a performant and safe way can be challenging, and some proposed approaches to addressing these uncommon conditions incorporate the use of teleoperations, or "human-in-the-loop" technology, to enable a human operator, who may be remote from the vehicle, to make decisions and assist in guiding a vehicle whenever some of these uncommon conditions are encountered by the vehicle.

Some proposed teleoperations approaches focus on direct control of a vehicle by a remote operator, whereby the operator is provided with sensor data collected by the vehicle and is able to directly control the vehicle from a remote location. It has been found, however, that direct control of a vehicle in such circumstances generally requires a fast, responsive and reliable network connection between the remote operator and the autonomous vehicle. Network connectivity and latency for an autonomous vehicle, however, can vary considerably based upon location (e.g., urban or rural, highway or side road, etc.) and network congestion. In addition, remote operators, even when provided with sensor data collected by a vehicle, may still lack full situational awareness due to the fact that they are not physically within the vehicle.

The disclosed implementations, on the other hand, focus on an indirect control methodology whereby a teleoperations service is able to provide suggestions or recommendations to an autonomous vehicle, while requiring any such directives or recommendations to be validated by the autonomous vehicle prior to being implemented. By doing so, safety and/or performance of the vehicle may be effectively decoupled from the performance of the network that links the teleoperations service with the autonomous vehicle.

Figure 2:
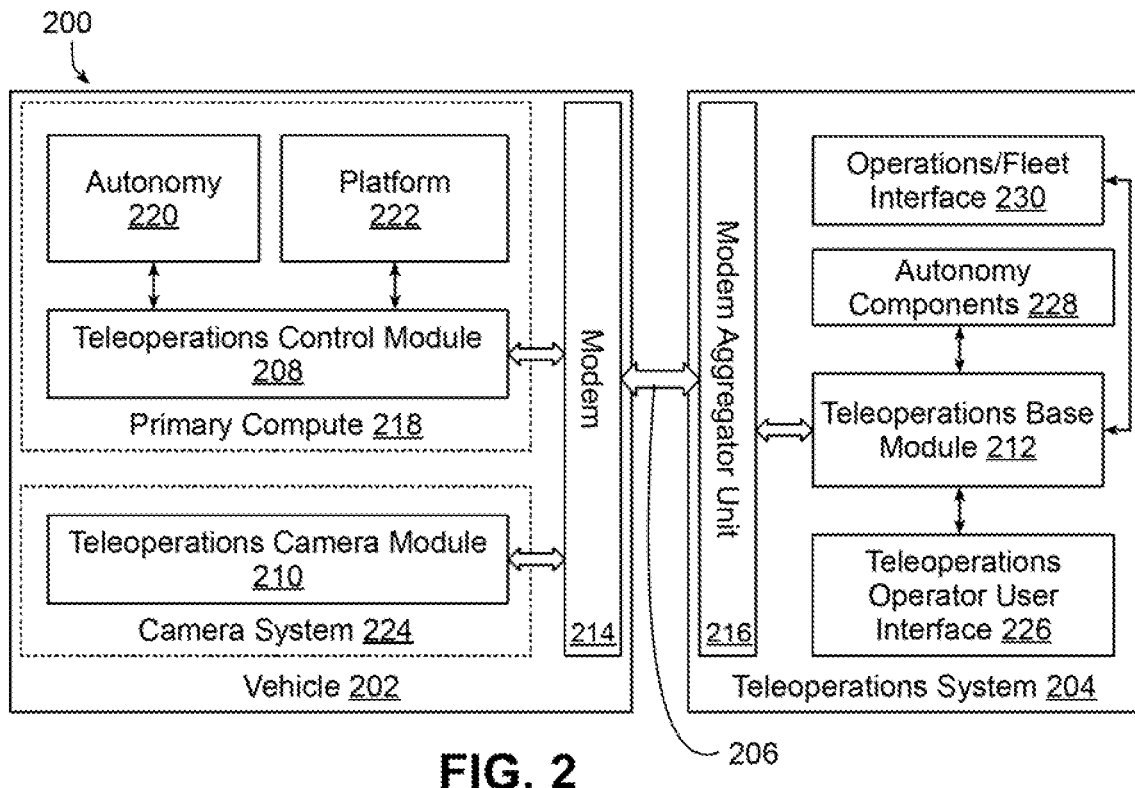
FIG. 2 is a block diagram illustrating an example implementation of a teleoperations-enabled system consistent with some implementations.

FIG. 2, for example, illustrates one example implementation of a teleoperations-enabled system or service 200 whereby an autonomous vehicle 202 is interfaced with a remote teleoperations system 204 over a network 206. Remote teleoperations system 204 may be physically remote from autonomous vehicle 202, and will generally support interface with multiple vehicles to enable multiple teleoperations operators to concurrently interact with multiple vehicles. As will become more apparent below, teleoperations operators may actively and continuously monitor individual vehicles in some implementations, while in other implementations, individual teleoperations operators may interact with multiple vehicles at different times, e.g., so that a particular operator may support multiple vehicles at one time. In some implementations, for example, teleoperations operators may be selectively coupled to particular autonomous vehicles on an on-demand basis, e.g., in response to requests generated by the vehicles whenever certain conditions (e.g., various uncommon situations that may benefit from teleoperations support) arise. In some implementations, a pool of operators may support a pool of autonomous vehicles, and a teleoperations system may initiate teleoperations sessions on an on-demand basis, e.g., based upon requests initiated by autonomous vehicles, the teleoperations system, or both.

Teleoperations support may be principally implemented in some implementations using a teleoperations control module 208 and a teleoperations camera module 210 in autonomous vehicle 202 in communication with a teleoperations base module 212 in teleoperations system 204. Modules 208 and 210 of vehicle 202 may be coupled to network 206 through a modem 214, while module 212 of teleoperations system 204 may be coupled to network 206 through a modem aggregator unit 216 capable of communicating with multiple modems 214 of multiple autonomous vehicles 202. Network 206 may be implemented in part using a wireless network such as a 4G, LTE or 5G network, a satellite network, or some combination thereof, although the invention is not so limited.

Teleoperations control module 208 may be resident in some implementations within a primary compute system 218 of vehicle 202, and may interface with each of an autonomy system 220 and platform 222 of the vehicle to collect and stream data from the primary compute system to teleoperations system 204 as well as receive and process operator inputs received from teleoperations system 204. In some implementations, primary compute system 218 may be implemented in a similar manner to primary vehicle control system 120 illustrated in FIG. 1, with autonomy system 220 representing high level autonomous control subsystems such as localization, planning, perception, etc., and with platform 222 representing lower level vehicle controls such as provided by control subsystem 158. However, it will be appreciated that teleoperations control module 208 may interface with practically any autonomy or control-related aspect of vehicle 202 in other implementations.

Teleoperations camera module 210 may be resident in some implementations within a camera system 224 that manages the on-board cameras on vehicle 202, and module 210 may, in some implementations, stream camera feed data collected from the on-board cameras to teleoperations system 204 for viewing by an operator during a teleoperations session. As will become more apparent below, in some implementations module 210 may dynamically vary the data streamed from the on-board cameras, e.g., to vary the priority, quality and/or resolution of each camera feed.

While modules 208 and 210 are implemented separately in FIG. 2, in other implementations, the functionality allocated to each module may vary, or the functionality may be combined into a single module or split into more than two modules. As such, the invention is not limited to the particular architecture illustrated in FIG. 2.

Teleoperations base module 212 communicates with modules 208 and 210 during a teleoperations session with vehicle 202, and may further manage multiple sessions for multiple vehicles and with multiple operators. Module 212 may also manage scheduling, initiation and termination of sessions in some implementations.

A teleoperations operator user interface 226 is coupled to module 212 to provide a user interface through which an operator, e.g., a human operator, may communicate with a vehicle 202 during a session. The user interface may be implemented in any number of suitable manners, and may utilize text, graphics, video, audio, virtual or augmented reality, keyboard input, mouse input, touch input, voice input, gesture input, etc. Dedicated or customized controls and/or indicators may also be used in some implementations. In addition, in some implementations an application, e.g., as may execute on a desktop computer or laptop computer, a mobile device, etc. may be utilized to interact with an operator, while in other implementations a web-based or remote interface may be used. In one example implementation discussed in greater detail below, for example, interface 226 may be a web-based interface that interacts with an operator via a touchscreen display.

Teleoperations system 204 may also include one or more autonomy components 228 interfaced with module 212. Autonomy components 228 may include various components that replicate the functionality of similar components in vehicle 202 and/or that are also accessible to a vehicle for use in connection with the primary control of the vehicle (e.g., components 240, 242 and 244 discussed below in connection with FIG. 3). For example, in some implementations, module 212 may have access to the same mapping data utilized by each vehicle, e.g., as provided by a relative atlas system as described above, as well as to similar layout functionality as is used by each vehicle to lay out mapping data in the immediate vicinity of a vehicle. By doing so, module 212 may effectively reconstruct a digital map of at least the fixed objects in the vicinity around a vehicle without having to receive the entire digital map from the vehicle itself, thereby reducing the volume of data streamed by the vehicle for the purpose of reconstructing the environment around the vehicle. In some implementations, the vehicle may provide a current pose of the vehicle as well as data regarding any dynamic entities detected by the perception system (e.g., other vehicles, pedestrians, or other actors or objects detected in the environment but not represented in the mapping data), and from this more limited amount of data, a graphical depiction of the immediate vicinity around a vehicle may be generated for display to a teleoperations operator. In some implementations, autonomy components may also replicate functionality implemented in vehicle 202 to enable local assessment of how a vehicle may respond to certain directives from the teleoperations system, and in some implementations, autonomy components may have similar functionality to that implemented in vehicle 202, but with greater capabilities and/or access to greater computing resources than may be available in the vehicle.

Moreover, in some implementations, a teleoperations system may be autonomous in nature as well, whereby the teleoperations system is effectively the teleoperations operator with which an autonomous vehicle interacts during a teleoperations session. In such instances, the teleoperations system may assess the current context of an autonomous vehicle and send commands, requests, directives, suggestions, etc. for addressing any conditions that triggered a teleoperations session. In some implementations, for example, a teleoperations system may have access to more compute power than can practically be provided onboard an autonomous vehicle, and thus the teleoperations system may be capable of performing computationally complex evaluations to assist an autonomous vehicle.

Teleoperations system 204 may also include an operations/fleet interface 230 to facilitate communication with other services that support autonomous vehicles. For example, it may be desirable in some implementations to provide an ability to request roadside assistance or recovery of an autonomous vehicle, or to provide log data for use in diagnosing vehicle issues. It may also be desirable to propagate data collected during a teleoperations session (e.g., data related to lane closures, detected construction or incidents, etc.) to other vehicles in a fleet. Moreover, data received and/or generated by the teleoperations system may be used as training data for further training various components of an autonomous vehicle, e.g., to improve the performance of a detector and reduce the occurrence of false positives, or to improve scenario selection and other decisions made by the autonomous vehicle in response to certain sensor input. Other external services may also interface with a teleoperations system in other implementations, as well be apparent to those of ordinary skill having the benefit of the instant disclosure.

Figure 3:
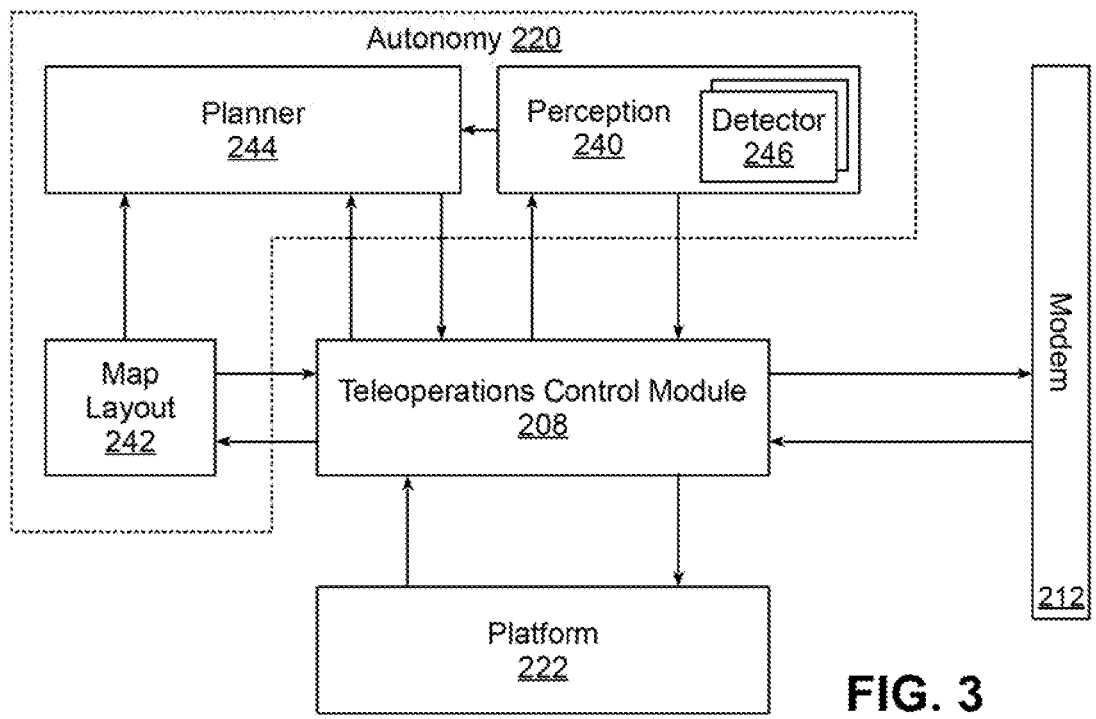
FIG. 3 is a block diagram further illustrating the teleoperations control module referenced in FIG. 2.

Now turning to FIG. 3, an example implementation of teleoperations control module 208 and the various interfaces supported thereby are illustrated in greater detail. In some implementations, for example, module 208 may include interfaces, e.g., Application Programming Interfaces (APIs) to teleoperations system 204 (via modem 212), to platform 222, and to each of a perception component 240, map layout component 242, and planner component 244 of autonomy component 220.

For the interface with teleoperations system 204, teleoperations control module 208 may be configured to communicate autonomy data (e.g., mapping data, perception data, route data, planning data), sensor data, telemetry data, etc. to teleoperations system 204 to provide the current status of the vehicle. Teleoperations control module 208 may also be configured to communicate various teleoperations requests to teleoperations system 204 and receive various teleoperations commands therefrom. Further, teleoperations control module 208 may be configured to receive requests for visualizations and communicate requested visualizations to teleoperations system 204.

Moreover, in some implementations it may be desirable to exchange heartbeat messages between teleoperations control module 208 and teleoperations system 204 to maintain an active connection between the autonomous vehicle and the teleoperations system. If, for example, due to loss of network connectivity, a failure of an autonomous vehicle to receive a heartbeat message from the teleoperations system within a defined time period or a failure of the teleoperations system to receive a heartbeat message from an autonomous vehicle within a defined period of time, it may be desirable in some implementations to take corrective action as a result of a lack of communication between the autonomous vehicle and the teleoperations system. From the perspective of the autonomous vehicle, it may be desirable to perform a controlled stop of the vehicle, while from the perspective of the teleoperations system it may be desirable to alert operations or fleet management.

For the interface with platform 222, teleoperations control module 208 may be configured to receive vehicle state information from the platform (e.g., various types of diagnostic and/or sensor data), and to issue various lower level commands to the platform, e.g., to honk a horn, activate or deactivate hazard lights, change gears, decommission the vehicle, initiate a controlled stop, etc.

For the interface with perception component 240, teleoperations control module 208 may be configured to receive from the perception component actors and/or tracks of actors detected in the environment, detections by various detectors 246 implemented in the perception component, and other perception-related data. All of such data may be communicated by module 208 to a teleoperations system as autonomy data. In addition, as will become more apparent below, module 208 may also communicate to perception component 240 any detector overrides generated by a teleoperations system, e.g., to indicate when a detector 246 has likely generated a false positive detection.

For the interface with map layout component 242, teleoperations control module 208 may receive, for example, local map data, route data and other mapping-related data from map layout component 242. Module 208 may also, in some instances, communicate map patches to map layout component 242, e.g., to generate lane closures, traffic device overrides, new destinations, virtual path suggestions, etc., or to clear out prior generated map patches applied to the local map stored in component 242, e.g., when a prior lane closure has been removed. Map layout component 242 may also, in some instances, forward map and route updates to planner component 244 to update scenarios being contemplated by the planner component during the operation of the autonomous vehicle.

For the interface with planner component 244, teleoperations control module 208 may receive, for example, generated plans, actor properties, alternate scenarios and other planning-related data. Teleoperations control module 208 may also forward various teleoperations commands to planner component 244, as well as receive teleoperations requests and/or feedback to teleoperations commands from planner component 244.

Figure 4:
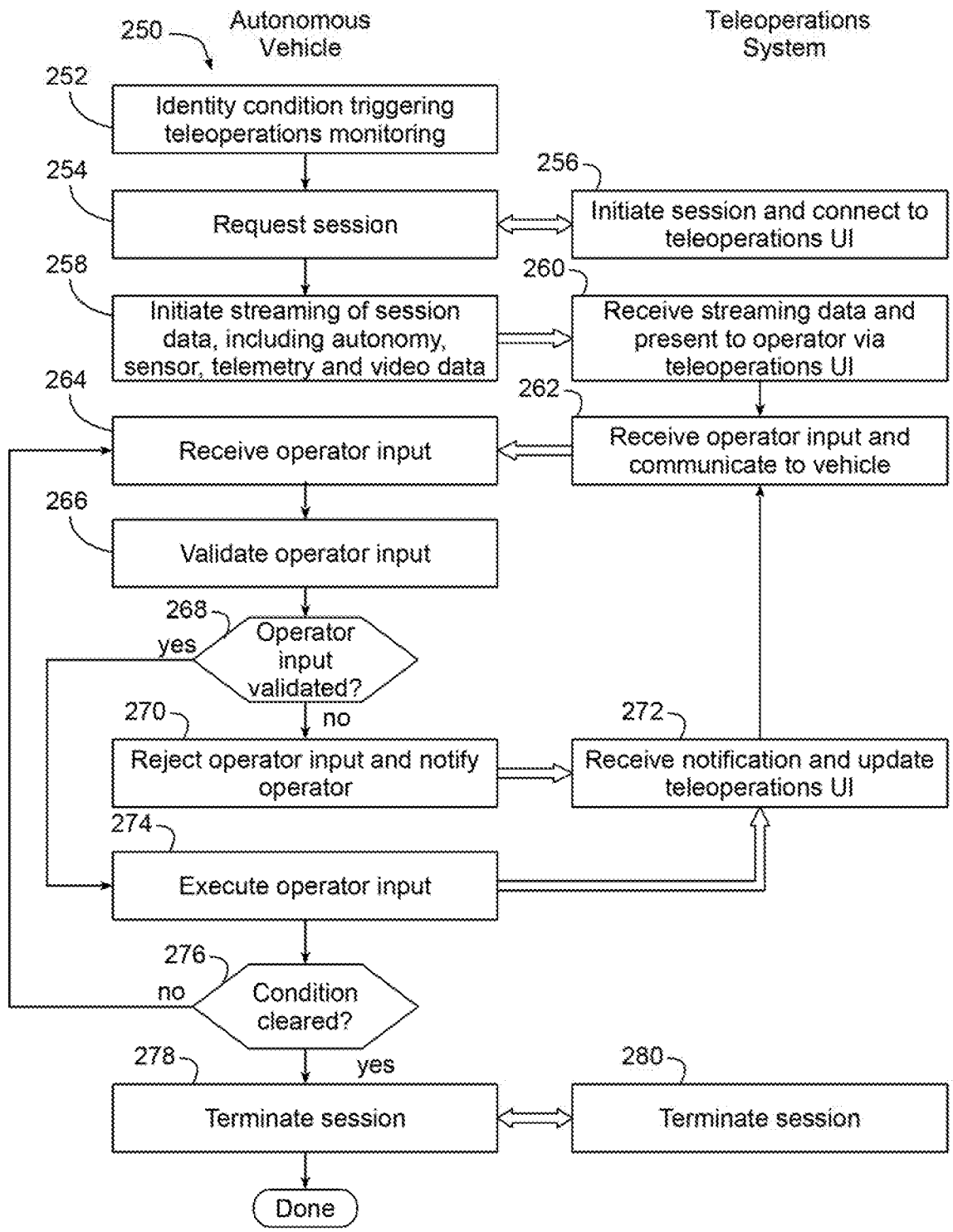
FIG. 4 is a flowchart illustrating an example sequence of operations for conducting a teleoperations session in the system of FIGS. 2-3.

Now turning to FIG. 4, while in some implementations, interaction between a teleoperations system and an autonomous vehicle may be continuous (e.g., whenever a vehicle is operating), in the illustrated implementation interaction between a teleoperations system and an autonomous vehicle is managed through interactive sessions that are initiated on-demand, often (although not necessarily exclusively) upon the request of an autonomous vehicle. FIG. 4 illustrates a sequence of operations 250, for example, that manages an interactive session between an autonomous vehicle and a teleoperations system. Operations performed within the autonomous vehicle are illustrated on the left side of the figure and operations performed within the teleoperations system are illustrated on the right side of the figure.

As illustrated in block 252, an autonomous vehicle may initially detect a condition that triggers a desire for teleoperations monitoring. As will become more apparent below, a condition may include, for example, a detection by a detector in a perception component, a request from a planner component for assistance with selection of a suitable scenario or path given current circumstances, a request initiated by a vehicle occupant, an error condition detected in the autonomous vehicle, or in other situations where teleoperations assistance may be desired. A non-exclusive list of potential conditions that may be sensed and used to trigger monitoring includes construction zones, temporary traffic devices, authorities directing traffic, loading or unloading school buses, emergency vehicles, the placement of signs, cones, or flares, crossing guards, funeral processions, collisions, inoperative traffic devices, etc. A condition that triggers a teleoperations session may also be based upon a scheduled time, a scheduled location (e.g., based upon the vehicle being at or proximate a particular geographical location, similar to a location-based reminder), or based upon a condition detected by another autonomous vehicle.

For example, it may be desirable in some implementations to automatically initiate teleoperations sessions with a vehicle in order to reassess certain conditions that have previously been detected, whether by the same autonomous vehicle or by other autonomous vehicles. One non-limiting example is that of a closed or rerouted lane that has been detected by an autonomous vehicle, and that during an initial teleoperations session results in the lane being marked closed to future travel. In some instances, the information about the closed lane condition may be propagated to other autonomous vehicles so that the other autonomous vehicles can be properly directed within another lane or to an entirely different road. Moreover, it may be desirable to automatically initiate a teleoperations session the next time the autonomous vehicle is at the same location, or even if another autonomous vehicle is in the same location, to enable a teleoperations systems operator to reassess the lane closure to determine if the original condition still exists. If the lane closure has been cleared, for example, this information may be propagated to other vehicles so that the other vehicles will no longer be directed around the previously-closed lane.

Now returning to FIG. 4, in response to detection of the condition, block 254 may communicate with the teleoperations service to request a session, which in block 256 initiates the session and connects the vehicle with an operator via a teleoperations user interface. It will be appreciated that at this time various routing decisions may be made to select an appropriate operator to interact with a vehicle, e.g., based upon operator availability (e.g., select only from among operators that are not currently in a session with another vehicle), operator expertise (e.g., select only from among operators having specific expertise with a particular condition or vehicle), operator responsibility (e.g., select only from among operators assigned to a particular fleet or set of vehicles), operator history (e.g., prioritize an operator that has previously been working with this particular vehicle), etc.

Once a session has been initiated, the autonomous vehicle may initiate streaming of session data in block 258. In some implementations, the session data can include autonomy data, sensor data, telemetry data and video data. The teleoperations system may receive the streamed session data and present the session data to the operator via the teleoperations user interface in block 260. The autonomy data may include, for example, various data associated with the current state of the vehicle or the current state of a control system for the vehicle. The autonomy data may include data related to states of detected conditions, plans, actors, actor paths, poses, scenarios, paths of the vehicle, etc. The sensor data may include, for example, data captured from various sensors such as radar, LIDAR, etc. In some implementations, the sensor data can also include image or video data obtained from one or more cameras. The telemetry data may include, for example, speed, location, acceleration, direction, etc., as well as various status information regarding the vehicle itself, e.g., various engine or motor data, fuel or charge data, or practically any other data that may be available from a vehicle. Video data may include, for example, streamed images captured by one or more cameras on the vehicle, e.g., to provide a visual look at the environment surrounding a vehicle (also referred to herein as "camera feed data"), as well as other image-related data such as historical or otherwise previously-stored video or still images. The session data that is streamed by the vehicle may otherwise include any type of data that assists a teleoperations operator with obtaining situational awareness regarding the current condition of the vehicle.

Thereafter, once presented with the session data, an operator may (i) generate one or more inputs that attempt to address the condition that triggered the session and (ii) communicate those inputs to the vehicle in block 262. The inputs may request additional data from a vehicle, may include one or more commands that instruct the vehicle to take a certain action, or may otherwise interact with the vehicle in order to address the condition.

Next, in block 264, the vehicle receives operator input, and block 266 validates the operator input. As noted above, in the illustrated implementation, an indirect control methodology is utilized whereby a teleoperations operator generally provides commands representing recommendations to an autonomous vehicle, which are then processed by the vehicle to implement those commands if appropriate. A recommendation refers to a high level directive provided to an autonomous vehicle. Based on the recommendation that is a high level directive, the autonomous vehicle control system may determine and execute a particular operation to control the autonomous vehicle rather than directly controlling the autonomous vehicle with the recommendation. For example, instead of providing, from a teleoperations system to the autonomous vehicle control system, commands specifying specific velocities, steering angles, and brake controls, recommendations such as "change lanes," "follow a suggested path," and "disregard a sensed condition" can be provided from a teleoperations system to an autonomous vehicle control system such that the autonomous vehicle control system can determine a particular operation such as specific velocities, steering angles, and brake controls to implement the recommendation. In these implementations, by providing the recommendations rather than the specific commands, less data may be transferred between the teleoperations system and the autonomous vehicle control system such that fewer network resources may be used.

In connection with processing those commands, the vehicle may validate those commands to ensure that the commands may be implemented without violating any constraints placed on the vehicle for performance and/or safety reasons. As an example, it may be desirable in some implementations to prohibit a teleoperations operator from recommending a path that would violate any boundaries established in mapping data (e.g., a boundary that prohibits a vehicle from using the shoulder of the road as a regular lane during normal operation).

In some implementations, it may also be desirable to delay or prohibit execution of commands until it is deemed safe for a vehicle to do so, e.g., based upon any perception constraints for the autonomous vehicle. For example, if a vehicle were to receive a directive to drive around an obstruction in a lane by driving into a lane that is primarily used for traffic in the opposite direction (e.g., to drive on the other side of a two-lane road), the vehicle may delay executing the directive until the perception component of the autonomous vehicle determines that the lane is free of traffic and/or pedestrians.

In some implementations, an autonomous vehicle, even in response to operator input from a teleoperations system, may effectively override and reject such input based upon one or more of operational constraints placed on the autonomous vehicle and current conditions sensed by the autonomous vehicle. Then, a notification indicating that the operator input from the teleoperations system is rejected can be provided from the autonomous vehicle to the teleoperations system. For example, where the operator input indicates honking the horn, an autonomous vehicle control system of an autonomous vehicle can determine not to honk the horn based on current conditions where the current conditions indicate that the autonomous vehicle is located in is a quiet residence area at midnight, or if other conditions exist such that the autonomous vehicle rejects the indication to honk the vehicle horn from the teleoperations system. In addition, the autonomous vehicle can send a notification of this rejection to the teleoperations system such that an operator can be notified that the operator input is rejected. In some implementations, this notification can be shared with other operators using the teleoperations system.

Thus, in response to the validation performed in block 266, block 268 may determine whether the operator input was validated. If not, control passes to block 270 to reject the operator input and notify the operator. This notification is received by the teleoperations system in block 272 and the teleoperations user interface is updated to reflect the rejection. Control then returns to block 262 to wait for additional input from the operator.

Returning to block 268, if the operator input has been validated, control passes to block 274 to execute the operator input. In some implementations, an autonomous vehicle can follow a path or scenario recommended by the operator input and execute particular operations to implement the path or the scenario. Once the autonomous vehicle system executes the operator input, the result of the execution can be updated to the teleoperations user interface. For example, the teleoperations user interface can be updated and show that the autonomous vehicle follows a particular path as recommended by the operator input.

Control then passes to block 276 to determine whether the condition that triggered the session has been cleared (e.g., when it is determined that a detector has been cleared, that an obstruction or other uncertainty detected by the vehicle has been resolved, etc.), and if not, control returns to block 264 to await further operator input (note that streaming of data continues to occur during this time so that the operator is provided with up-to-date information on the current status of the vehicle). If, however, the condition has been cleared, block 276 passes control to blocks 278 and 280 to terminate the session, whereby the vehicle interacts with the teleoperations system to discontinue the session on each end. In other instances, however, it may be desirable to wait and have an operator terminate a session rather than have the vehicle itself determine when the session is ready to be terminated.

As noted above, it may be desirable to utilize teleoperations support for a vehicle other than based upon conditions detected by the vehicle. For example, it may be desirable to initiate sessions whenever a vehicle transitions from a standby mode (e.g., where the vehicle is parked and idle) to any other mode (e.g., enroute, loading, unloading, or teleoperations modes) to ensure that an operator can view the environment surrounding the vehicle before the vehicle transitions. It will be appreciated, for example, that if a vehicle has been shut off for any appreciable amount of time, activities may have occurred while the vehicle was shut off that were not sensed by the vehicle, so a review by an operator prior to transitioning the vehicle may be desirable in some instances.

In addition, it may also be the case that an operator may monitor an autonomous vehicle continuously in some implementations, and may be able to initiate a session in response to circumstances that the vehicle may itself not detect, e.g., funeral processions, other vehicle collisions, vehicle collisions with actors that are not sensed by the vehicle, when a vehicle is creating a nuisance, etc.

Figure 5:
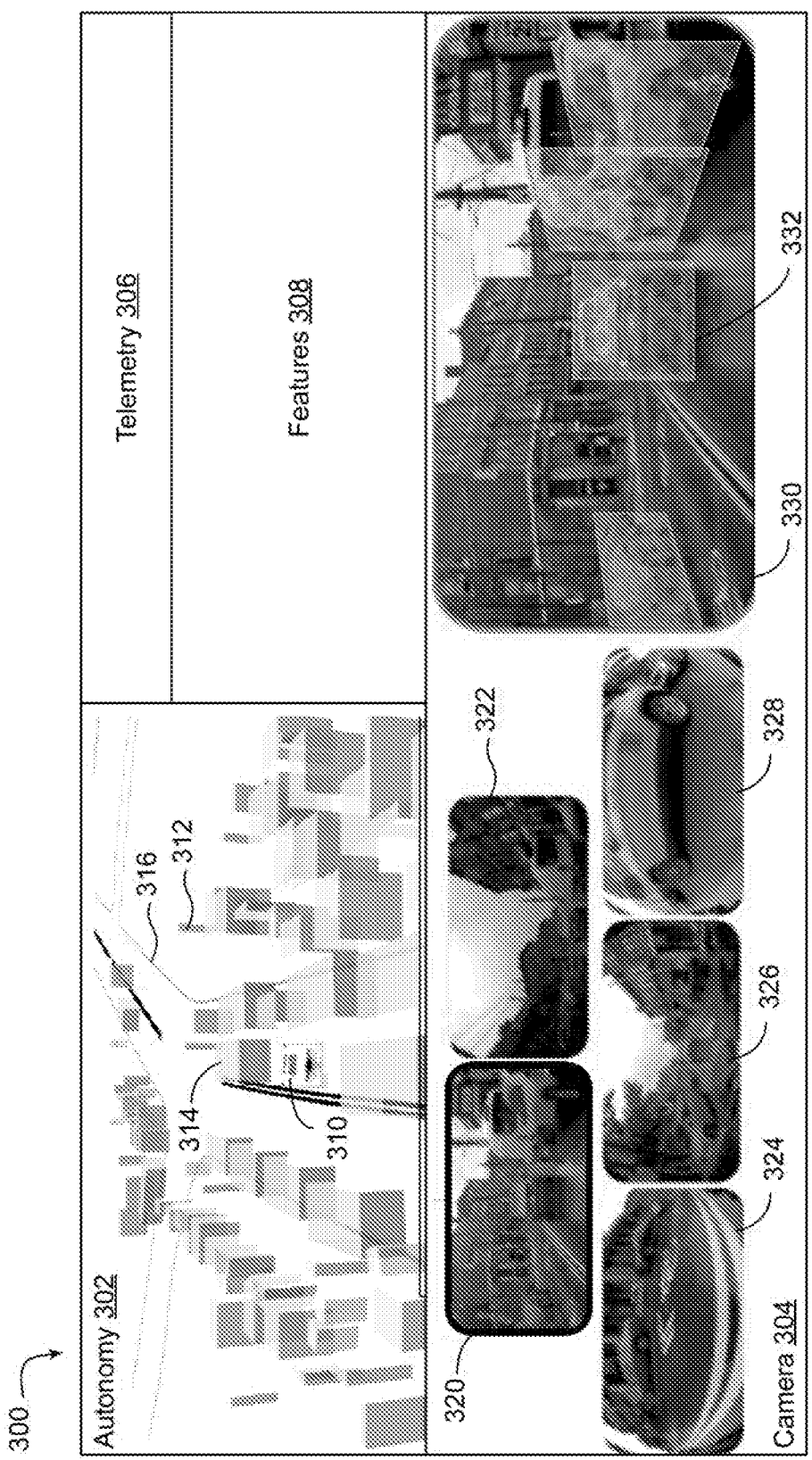
FIG. 5 illustrates an example teleoperations user interface for the system of FIGS. 2-3.

Now turning to FIG. 5, an example user interface that may be displayed to an teleoperations system operator, e.g., via a touchscreen or non-touch screen computer display, a mobile device display, or other suitable display technology, is illustrated at 300. In this example user interface, four panels 302-308 are utilized, including an autonomy panel 302, a camera panel 304, a telemetry panel 306 and a features panel 308.

Autonomy panel 302 may be used to display information from the autonomy component of an autonomous vehicle and reflecting the environment in which the vehicle is currently operating, including, for example, graphical depictions of the vehicle, its current path or trajectory, its current intended actions (e.g., stop, merge, follow, etc.), the boundaries, lanes, elements etc. of the road upon which it is operating, the fixed objects (e.g., buildings) within the environment, the dynamic objects or actors (e.g., pedestrians, bicycles, other vehicles, etc.) and/or their projected paths within the environment, ephemeral objects, etc. In some implementations, the same mapping data may be available to the teleoperations system as the autonomous vehicle, however, so a substantial portion of the data used to generate the visualization depicted in autonomy panel 302 (e.g., the road and fixed objects in the vehicle's environment) may be determined locally by the teleoperations system rather than by communicating that data from the vehicle to the teleoperations system, thereby reducing the bandwidth required to generate the visualization.

FIG. 5, for example, illustrates an example three-dimensional overhead following view for autonomy panel 302 including a graphical representation of an autonomous vehicle 310 as well as graphical representations of static objects in the environment (e.g., buildings 312), dynamic objects or actors in the environment (e.g., vehicle 314), and various boundaries in the environment (e.g., road boundary 316). Additional information, e.g., various paths or tracks of the vehicle and/or the dynamic objects, traffic lights and/or traffic light states, or any other information capable of supplementing a teleoperations system operator's situational awareness, may also be displayed in such a view.

Camera panel 304 may be used to display video data captured by one or more cameras disposed on the vehicle and streamed to the teleoperations system, thereby enabling an operator to view the vehicle's current environment and enhancing an operator's situational awareness. In the illustrated implementation, five cameras may be used, e.g., a forward-looking traffic light camera with a 120 degree field of view to provide situational awareness when loading/unloading a vehicle or to monitor traffic light state when enroute, along with four fisheye cameras with 180 degree fields of view and directed in forward, rear, left and right directions to provide situational awareness and/or to locate blocking objects surrounding the vehicle. In some implementations, an interior camera may also be used, as may other types of cameras for which situational awareness for a teleoperations operator would be improved. An example display of a forward-looking traffic light camera is illustrated at 320, while displays of forward, left, rear and right fisheye cameras are illustrated at 322, 324, 326 and 328. Other combinations of cameras, including fewer or greater numbers of cameras, may be used in other implementations, as well as different types of cameras having differing fields of view, differing resolution and/or different capabilities. For some types of longer vehicles, e.g., buses, trucks, etc., for example, additional side view cameras may be used to provide adequate coverage over the full lengths of such vehicles.

In some implementations, and as will become more apparent below, it may be desirable to highlight a particular camera feed, e.g., in a separate enlarged display 330, based upon a context of the vehicle and/or based on an operator's preference. Display 330, for example, illustrates an enlarged view of the traffic light camera feed, and it will be appreciated that the border of display 320 is highlighted to indicate this relationship.

In addition, in some implementations, any of displays 320-330 may be annotated with autonomy-related information, e.g., as represented by boxes 332 in display 330 that illustrate the extents of various actors in the vicinity of the vehicle. The autonomy-related information may be overlaid by the teleoperations system in some implementations, e.g., based upon the autonomy data received from the vehicle and used to generate the autonomy panel, while in other implementations the autonomy-related information may be integrated into the video data of a camera feed by the vehicle prior to communicating the video data to the teleoperations system, e.g., by painting or drawing boxes 332 or other textual and/or graphical elements onto the frames of the video data prior to communicating the video data to the teleoperations system.

In some implementations, an operator may select different camera feeds to present in display 330, e.g., by touching or clicking on one of displays 320-328. Further, in some implementations, a current context of the vehicle, determined either by the vehicle or the teleoperations system, may be used to select which camera feed is presented in display 330. For example, where a teleoperations session is initiated due to an obstruction detected on the right side of the vehicle, it may be desirable to initially present the camera feed for the right side fisheye camera in display 330.

Telemetry panel 306 may be used to display basic information about the vehicle, including, for example, speed, fuel or charge level, autonomy state, and any detected vehicle or autonomy system faults. Features panel 308 may be used to display various information and controls to be used by a teleoperations system operator to interact with the vehicle and provide commands, requests, directions or other feedback to the vehicle. While features panel 308 may concurrently support all of the possible interactions between an operator and a vehicle in some implementations, in other implementations it may be desirable to dynamically update features panel 308 to support different interactions based upon the context of the vehicle and/or input from the operator.

It will be appreciated that different arrangements, sizes, numbers, and layouts of panels and displays may be used in a teleoperations user interface in other implementations, and that more or less data and types of data may be presented to an operator through such an interface. In some implementations, a user interface may be configurable by an operator (e.g., to suit an operator's personal preferences). In some implementations, a user interface may be dynamically modified by the teleoperations system based upon contextual information (e.g., to enhance situational awareness by displaying or highlighting data that is most relevant to a particular situation). Other user interfaces and/or form factors may be used to interact with an operator in other implementations as well, e.g., using various input devices such as keyboards, mice, etc., using voice input, gesture input, touch input, etc. Therefore, the invention is not limited to the particular user interface implementations discussed herein.

Detector Management

Autonomous vehicles may be configured to detect a number of conditions within the environment surrounding a vehicle. The perception system of an autonomous vehicle is generally responsible for detecting, tracking and/or identifying elements within the environment surrounding an autonomous vehicle. In some implementations, a perception system may utilize one or more "detectors" that are configured to sense certain specific conditions within the environment. The detectors may be implemented in software in some implementations, e.g., via trained machine learning models, and may be based upon input from one or more types of sensors available to the perception system. Detectors may also be implemented in other implementations using separate hardware and/or sensors, although in the illustrated implementation the detectors are software-implemented and execute on the same hardware and use the same sensors as the perception system of the vehicle.

Such detectors may be used in some implementations, for example, to sense particular events or conditions that are defined at a relatively high level but that are expected to occur with only limited frequency in the environment. Examples of some detectors that may be used include construction detectors that may be used to detect the presence of construction in the proximity of the vehicle, emergency vehicle detectors that may be used to detect the presence of an emergency vehicle (e.g., an ambulance, fire truck, police car, etc.) in the proximity of the vehicle and responding to an emergency situations (e.g., operating with its lights and/or siren on, and potentially at a high rate of speed), school bus detectors that may be used to detect the presence of a school bus having its stop arm extended (indicating that vehicles must stop to allow passengers to board or get off of the bus), funeral procession detectors that may be used to detect funeral processions (multiple vehicles with lights on and travelling in a group, possibly at lower-than-usual speeds, and having the right of way as opposed to normal traffic controls), crossing guard detectors that may be used to detect a crosswalk or intersection currently being controlled by a crossing guard, map change detectors that may be used to detect changes in sensed data relative to mapping data (e.g., lane markings repainted, traffic lights changed or moved, road closures, etc.), etc.

Construction detectors may be configured to detect a wide variety of conditions, e.g., lane blockages (e.g., due to traffic cones or barrels, flares, construction vehicles, signs, road debris, fallen trees, fallen power lines, etc.), lane construction, temporary traffic control devices (e.g., temporary stop signs or flashing red or yellow lights at intersections that are normally controlled by traffic lights), authorities directing traffic (e.g., one or more people in an intersection wearing yellow vests and directing traffic through the intersection), etc. In some implementations, construction detectors may be used to sense static and moving construction-related blockages; blockages that can be passed in same direction driving lanes as well as blockages that can only be passed by traveling in oncoming lanes, shoulders, or other drivable spaces outside of mapped road lanes; and blockages that are being controlled (e.g., by an unmapped traffic device or construction worker) and blockages that are uncontrolled beyond the flow of traffic and the availability of free space).

Detectors may also be used to sense other conditions more specific to the autonomous vehicle itself. For example, an indecision or "stuckness" detector may be used to sense when the autonomous vehicle appears to be in a location where the vehicle has no options for movement and/or where the vehicle has been stopped for a lengthy period of time. In one example discussed in greater detail below, for example, where an autonomous vehicle is on a two-way road with one lane in each direction and no passing is allowed, and a vehicle in front of the autonomous vehicle is not moving (e.g., due to a break down, being double parked, during loading or unloading, etc.), it may be desirable to indicate an indecision condition for the vehicle since no forward movement options appear to be available to the autonomous vehicle, or otherwise when the vehicle has not moved for a predetermined period of time. As another example, a rider request detector may be used to detect when an individual is attempting to hail the autonomous vehicle (e.g., where the autonomous vehicle is used as a livery vehicle, bus or coach, and an individual is gesturing for a ride).

It will be appreciated that for many types of detectors, false negatives (i.e., failing to detect a condition that a detector is designed to detect) are generally of greater concern than false positives (i.e., detecting a condition when the condition does not actually exist). As such, it is generally desirable to configure many such detectors as "high recall" detectors that have greater sensitivity and thus a reduced likelihood of failing to detect events or conditions in the environment, i.e., such high recall detectors are effectively biased to reduce false negative detections. With greater sensitivity, however, comes an increased likelihood of false positives, and as a result, it may be desirable in some implementations to utilize a teleoperations system to "override" any false positives detected by a detector. By doing so, a teleoperations system operator can effectively assess the current context of the vehicle upon triggering of a high recall detector and, if the detected condition does not actually exist, override and reset the detector to enable the vehicle to return to normal operation.

It will be appreciated that the vehicle responses to some types of detected conditions would be considered a nuisance to other vehicles if the detected conditions did not actually exist. Consider, for example, an autonomous vehicle approaching a school bus from the opposite direction, and a school bus detector incorrectly detecting the school bus as being stopped with its stop arm extended. A proper response to such a detection would have the autonomous vehicle come to a complete stop, yet if the condition did not actually exist, the vehicle would stop traffic in its lane needlessly.

Figure 6:
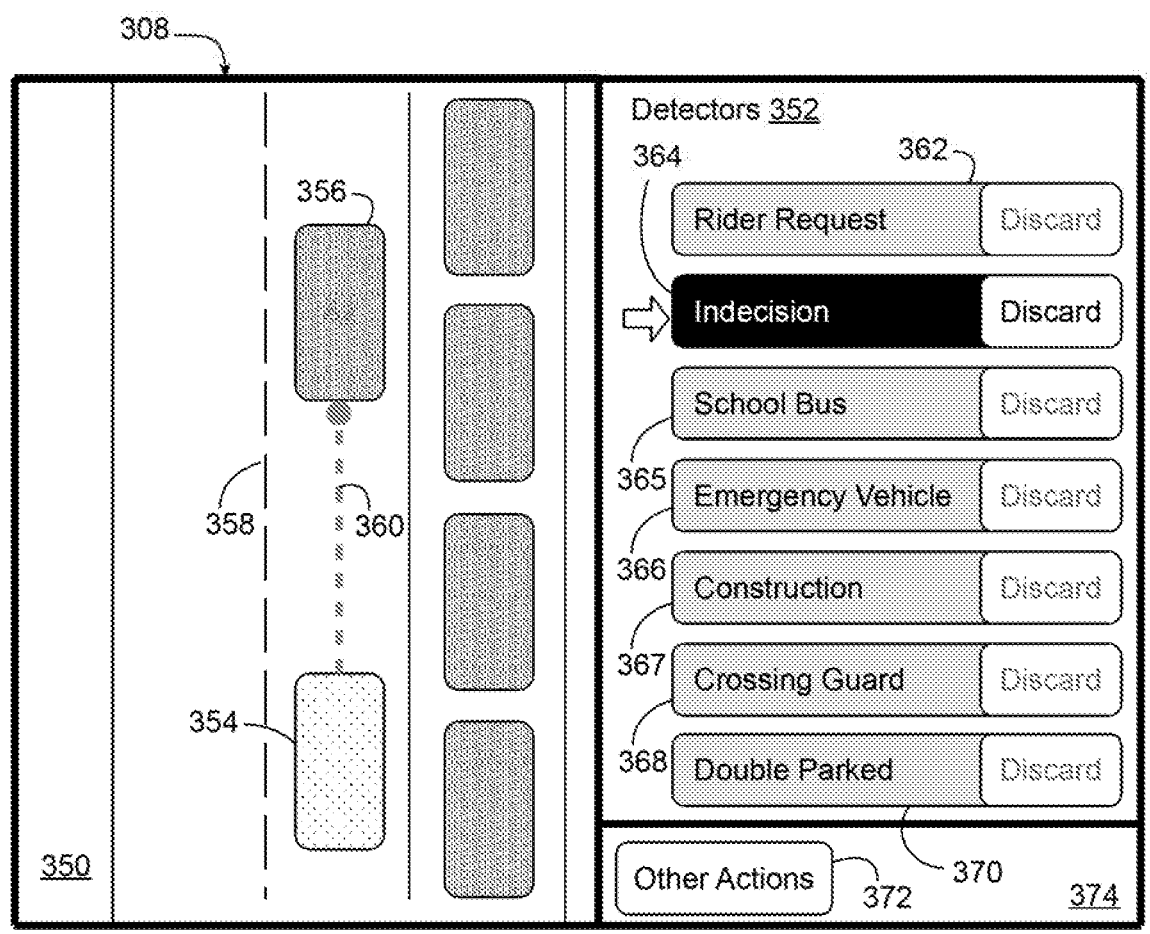
FIG. 6 illustrates an example implementation of the features panel of the teleoperations user interface of FIG. 5.

Accordingly, it may be desirable in some implementations to provide a relatively simple and responsive user interface to facilitate overrides of false positive detector responses. FIG. 6, for example, illustrates a detector-centric implementation of features panel 308 of FIG. 5. This detector-centric implementation may be displayed, for example, in response to initiation of a teleoperations session after detection by a particular detector, or alternately, in response to user input by a teleoperations system operator. As noted above, in other implementations features panel 308 may display additional information and user controls unrelated to detector overrides, so the invention is not limited to the specific implementation illustrated herein.

Feature panel 308 in FIG. 6, for example, may include a map sub-panel 350 and a detectors sub-panel 352. Map sub-panel 350 may provide an overhead view of the vehicle and its environment, and may include, for example, a graphical representation of the autonomous vehicle 354, graphical representations of various other dynamic objects or actors (e.g., vehicle 356), graphical representations of various boundaries (e.g., lane boundary 358), and graphical representations of current and/or potential vehicle scenarios (e.g., current track 360, representing moving forward and following a safe distance behind vehicle 356). In some implementations, map sub-panel 350 may be customized to display information that is relevant to a triggered detector, e.g., to highlight the graphical representation of a school bus that has triggered a school bus detector, to highlight the graphical representation of an emergency vehicle that has triggered an emergency vehicle detector, etc. By doing so, the teleoperations system operator may be provided with information that is relevant to determining whether or not a detector trigger is a false positive.

Detectors sub-panel 352 may include a number of user interface controls, i.e., detector override controls 362-370 associated with different detectors for the autonomous vehicle. Control 362, for example, is associated with a rider request detector that detects when an individual is attempting to summon the vehicle. Control 364 is associated with an indecision detector that detects when the vehicle is unable to determine any suitable paths forward. Control 365 is associated with a school bus detector that detects when a school bus is stopped or slowing with its stop arm extended, and control 366 is associated with an emergency vehicle detector that detects when an emergency vehicle is in the vicinity with its lights and/or siren on. Control 367 is associated with a construction detector that detects when a construction zone is in the vicinity, and control 368 is associated with a crossing guard detector that detects when an intersection or crosswalk in the vicinity is currently being controlled by a crossing guard. Control 370 is associated with a double parked detector that detects when a vehicle is double parked in a driving lane in the vicinity.

Controls 362-370 may be displayed in some implementations regardless of whether the associated detector has been triggered, while in other implementations a control may be hidden if its associated detector has not been triggered. In the illustrated implementation, a control is displayed differently depending on whether the associated detector is currently triggered, so FIG. 6 illustrates control 364 with a different color or shade from controls 362 and 365-370 to indicate that the indecision detector has been triggered while the other detectors have not.

Each control 362-370 in the illustrated implementation is implemented as a slider control that may be activated by swiping right to left, e.g., by clicking or touching the "discard" button on the control and dragging it to the left. By doing so, the detector trigger is discarded and overridden, and the vehicle is notified that the condition that was detected was associated with a false positive. As such, the vehicle may return to normal operation.

It will be appreciated that a slider control is generally simple to actuate, so that when a teleoperations system operator has determined that a detected condition is a false positive, the operator can readily override the detector. A wide variety of alternate controls may be used as a detector override control in other implementations, including graphical buttons, voice or gesture inputs, etc. In addition, rather than overriding a detector with one user input, in other implementations multiple inputs may be used, e.g., to open a window to view additional information about a detected condition prior to overriding the detector, to provide additional input options to issue other commands to the vehicle, etc.

Figure 7:
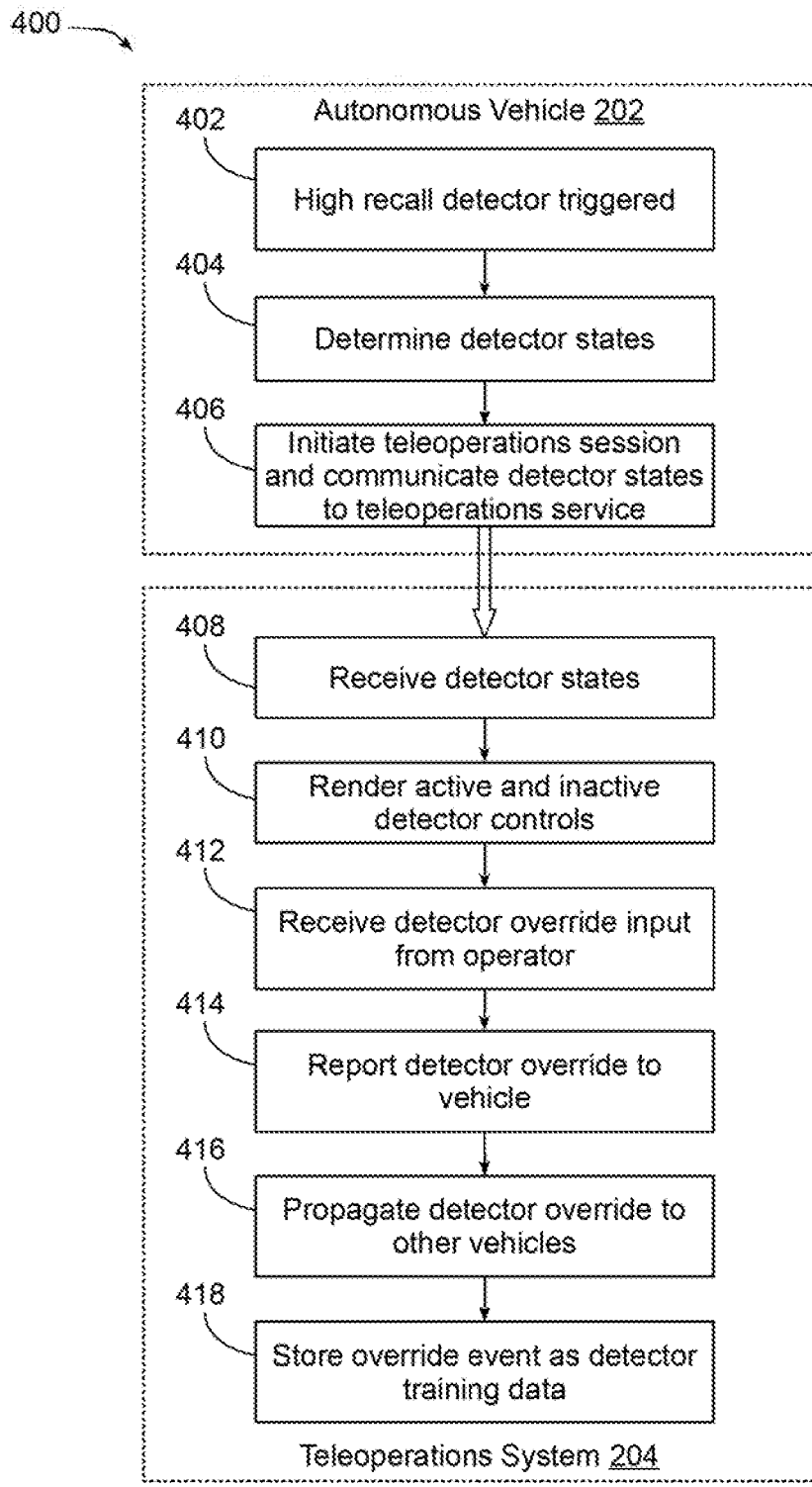
FIG. 7 is a flowchart illustrating an example sequence of operations for overriding a detector in the system of FIGS. 2-3.

Now turning to FIG. 7, an example sequence of operations 400 for overriding a detector with a teleoperations service is illustrated in greater detail. In block 402, a high recall (or other) detector in autonomous vehicle 202 is triggered, and in block 404, the vehicle 202 determines the states of all of the detectors. Then, in block 406 the vehicle 202 initiates a teleoperations session with teleoperations system 204, and once established, communicates the detector states to the teleoperations system 204 along with the other context data for the vehicle.

In this regard, the context data may represent practically any data that may be relevant to the current state of the vehicle and its surroundings, and furthermore relevant in some manner to any decisions that may be asked of a teleoperations system operator during a teleoperations session-particularly decisions associated with verifying any conditions detected by a detector in the autonomous vehicle. For example, where it is known that a school bus detector has been triggered, and that the school bus is located straight ahead of the autonomous vehicle, the context data that may be communicated for presentation to a teleoperations system operator may focus on data associated with the track or path of the school bus, data associated with the track or path of the autonomous vehicle, data associated with the speed of the autonomous vehicle, video data associated with any forward-facing camera feeds, or any other data that may be of use to a teleoperations system operator when attempting to verify whether the school bus does in fact have its stop arm extended and is either stopped or is in the process of stopping to load or unload passengers. It will be appreciated that in some implementations the type of context data that is communicated may vary depending upon the detector that was triggered, i.e., so that the data that is communicated varies depending on the detector that was triggered, while in some implementations the same type of context data may be communicated by the autonomous vehicle regardless of whether and/or which detector was triggered, but with a certain type of context data presented to or otherwise highlighted to a teleoperations system operator based upon the particular detector that was triggered.

Next, as illustrated in block 408, teleoperations system 204 receives the detector states, and in block 410, active and inactive detector controls are rendered in a teleoperations user interface (e.g., similar to controls 362-370 of FIG. 6). Next, in block 412, a detector override input is received from an operator (e.g., by activating the associated control 362-370), and in response to this input, block 414 reports the detector override to vehicle 202, thereby causing the vehicle 202 to reset the detector and resume normal operation (i.e., operation based upon the context of the vehicle but assuming the detector is signaling a false positive condition).

In addition, blocks 416 and 418 illustrate two additional and optional operations that may be performed in sequence 400 in some implementations. In some implementations, and as illustrated in block 416, it may be desirable to propagate the detector override to one or more other vehicles, e.g., other vehicles in the same fleet and/or same geographical area. By doing so, other vehicles encountering the same conditions that triggered the detector for the first vehicle may be permitted to ignore or reset their own respective detector triggers without initiating a teleoperations session. It will be appreciated that it will generally be desirable to limit such functionality in both time and space, as the conditions that triggered a detector in one vehicle may not necessarily be the same conditions that trigger a detector in other vehicle (e.g., even if a school bus detector trigger is a false positive because a detected school bus doesn't have its stop arm extended, the same school bus may extend its stop arm within a relatively short amount of time and a relatively short distance away from where the false positive detection occurred, whereby a subsequent detection may not be a false positive). One non-limiting example of a suitable implementation of such functionality might be where flashing signage on the side of a road generates a false positive for an emergency vehicle detector in one vehicle, in which case it may be desirable to propagate the false positive to other vehicles so that when those vehicles pass the same location, any false positive detections of the same flashing signage may be ignored or reset without initiating a teleoperations session.

Also, in some implementations, and as illustrated in block 418, it may be desirable to store the override event as training data for the detector. Both the fact that the detection was a false positive, and the associated context data for the vehicle surrounding the detection may be used to improve a machine language model used by or as a detector in some implementations. Thus, the teleoperations system operator may be used to effectively train and improve detectors via the override decisions. In some implementations, the fact that a given detector trigger was not overridden may also be considered an override event that may serve as training data for a detector, thereby reinforcing the correct detection made by the detector.

It will be appreciated that detectors may be implemented for practically any condition capable of being encountered by an autonomous vehicle other than those enumerated herein, so the invention is not limited to the particular types of detectors disclosed herein. It will also be appreciated that detectors need not be separately implemented from one another in some implementations, e.g., such that one component (e.g., a perception component) may be capable of detecting multiple different types of conditions. A detector in this regard may therefore be considered to include any hardware and/or software capable of detecting one or more defined conditions or events encountered by an autonomous vehicle.

Other Actions

Figure 8:
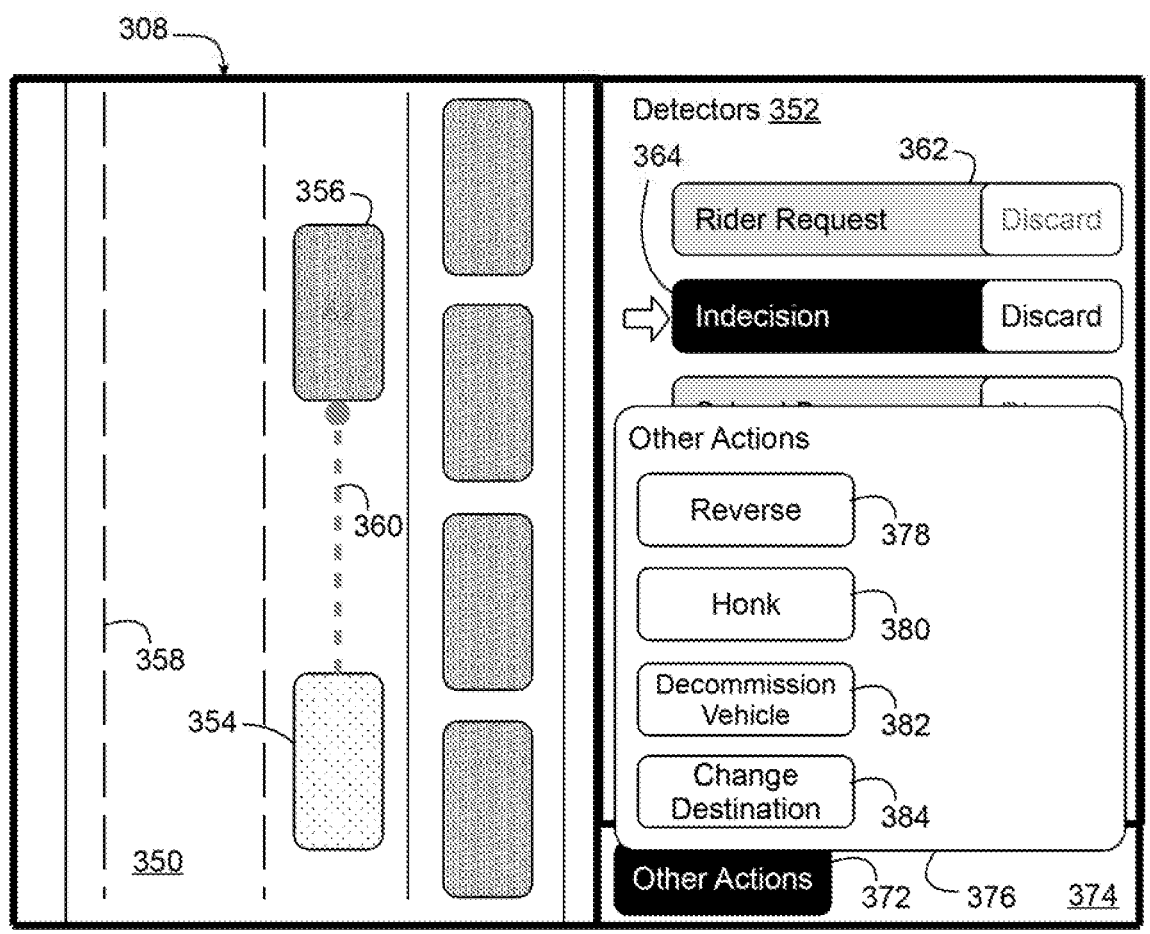
FIG. 8 illustrates the features panel of FIG. 6 subsequent to user selection of an "other actions" control.

Returning to FIG. 6, it may also be desirable to support additional actions capable of being performed by an operator of a teleoperations system. In the illustrated implementation, for example, these additional actions may be accessed via an "other actions" control 372 disposed in a sub-panel 374 of features panel 308. As illustrated in FIG. 8, selection of control 372 may cause display of a supplemental display (e.g., pop-up window 376) including additional user interface controls 378-384.

Control 378 is a reverse control that enables a teleoperations system operator to command or request that the vehicle operate in reverse. In some implementations, an operator may specify a distance, or a default distance may be used. Of note, even when a reverse command is issued, validation by the autonomous vehicle may still be performed, e.g., to restrict motion when static objects and/or dynamic objects or actors are sensed behind the vehicle, or when the reverse path would leave a drivable area of the map, enter an intersection or otherwise position the vehicle in an undesirable location.

Control 380 is a honk control that activates a vehicle horn (e.g., via platform component 222). Activating a horn may be desirable, for example, when an individual is detected near the vehicle or in its desired path, or to otherwise alert another driver or individual in the vicinity.

Control 382 is a decommission vehicle control that, when activated, parks the vehicle if possible, activates the vehicle hazard lights, and may generate a request for retrieval of the vehicle. The control may also, in some implementations, summon a substitute mode of transportation for any passenger in the vehicle. Such a control may be actuated, for example, in response to diagnostic data, a loss of communication to one or more vehicle sensors, or practically any scenario where it may be desirable to stop the vehicle rather than continue its operation.

Control 384 is a change destination control that, when activated, changes the destination of the vehicle on a map and causes rerouting of the vehicle to the new destination. In some implementations, it may be desirable to change the destination because of a road closure, while in other implementations, the destination change may be a result of interaction with a passenger of the vehicle, e.g., where a passenger issues a request to speak to a teleoperations system operator and request a new destination during the conversation.

It will be appreciated that controls 378-384 may be suitable for use in response to any number of other situations that may arise during the operation of an autonomous vehicle. It will also be appreciated that other types of controls may be used in addition to or in lieu of those illustrated in FIG. 8. Moreover, it will be appreciated that any of controls 378-384 may be implemented using different types user interface controls, may be combined with other user interface controls, or may otherwise be presented to a teleoperations system operator in other manners. As such, the invention is not limited to the particular user interface control arrangements illustrated herein.

Dynamic Camera Feed Optimization

Returning now to FIG. 2, as noted above, teleoperations camera module 210 is used to stream video or camera data from camera system 224 for viewing in a teleoperations session with teleoperations system 204. Video streaming generally places comparatively higher demands on available bandwidth in a network connection, and particularly within the context of autonomous vehicles that may be called upon to operate in regions having sub-optimal network connections, balancing camera stream quality with available bandwidth can be challenging in many applications.

In some implementations, it may be desirable to dynamically optimize multiple camera feeds from an autonomous vehicle to optimize bandwidth consumption and network latency for a teleoperations session. Camera feeds, as noted above, provide a teleoperations system operator with situational awareness during a teleoperations session, and as such, maximizing the video quality of the camera streams viewed by an operator is desirable. Moreover, camera feeds are generally required to share bandwidth in a teleoperations session with other time-sensitive data used during the session (e.g., autonomy data, sensor data, telemetry data, teleoperations commands/requests/responses, etc.).

Figure 9:
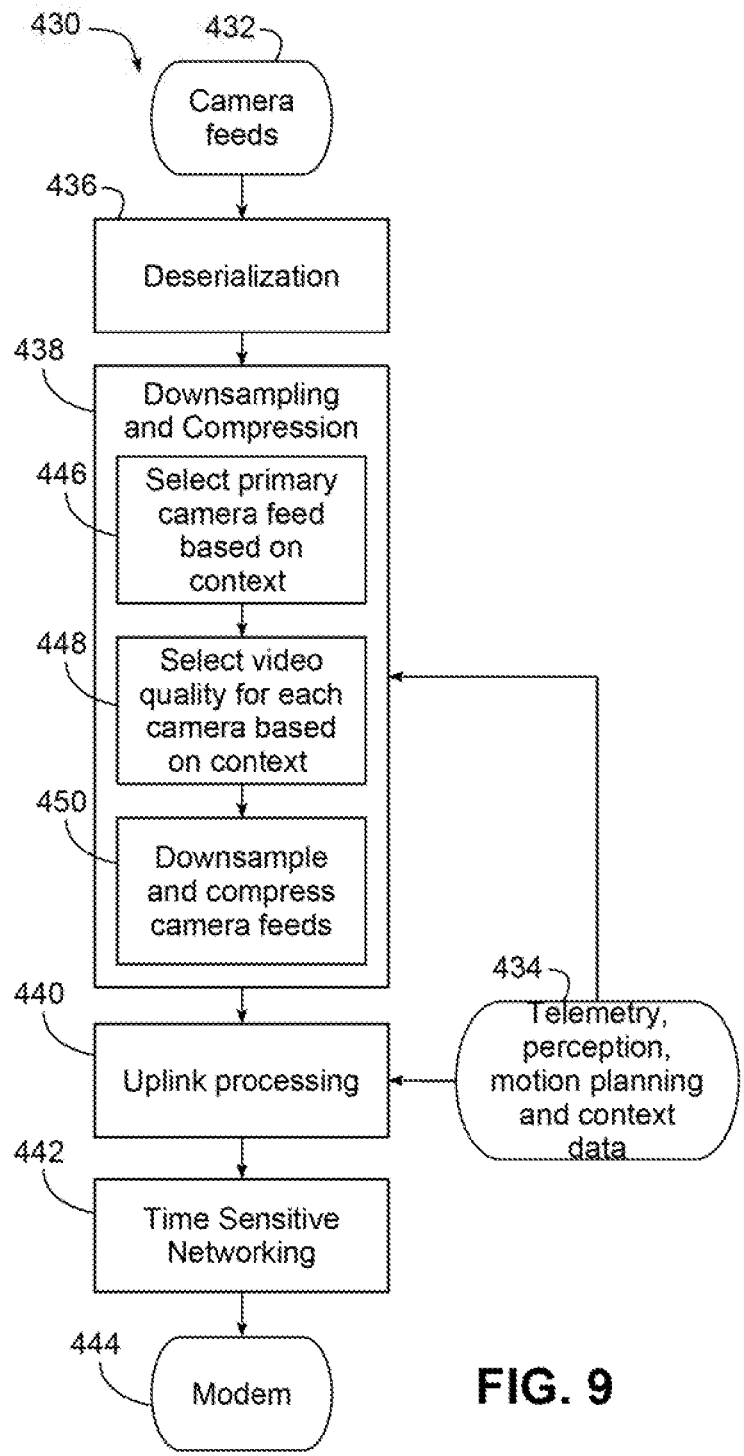
FIG. 9 is a block diagram illustrating the flow of teleoperations session data from an autonomous vehicle in the system of FIGS. 2-3.

In some implementations consistent with the invention, therefore, it may be desirable to dynamically vary the quality of one or more camera feeds, in part based upon the context of the vehicle and/or the needs of a teleoperations system operator. FIG. 9, for example, illustrates at 430 a flow of teleoperations session data from an autonomous vehicle in a manner consistent with some implementations. Session data generated by an autonomous vehicle is represented in FIG. 9 as a group of camera feeds 432 (e.g., generated by the traffic light camera and four fisheye cameras discussed above in connection with FIG. 5, or by other combinations of cameras) along with other data 434 (e.g., telemetry, perception, motion planning, context data, etc.).

In this regard, context data may represent practically any data that may be relevant to the current state of the vehicle and its surroundings, and furthermore relevant in some manner to any decisions that may be asked of a teleoperations system operator during a teleoperations session. For example, where it is known that a particular object, obstruction, actor, etc. is located behind or to the right or left side of a vehicle, that aspect of the context of the vehicle may be relevant to which camera feed will be of most use to a teleoperations system operator when determining how to respond to the vehicle. Furthermore, where it is known that a particular object of concern is either far or near to the vehicle, or where the object of concern is relatively large or relatively small, that aspect of the context of the vehicle may be relevant as to one or both of the field of view and the resolution needed to adequately present that object to the teleoperations system operator for inspection and analysis. Where one object is relatively far away and relatively small, it may be necessary to maximize the quality of a camera feed in order to enable an operator to view the object, whereas for another object that is close and/or relatively large in size, even a low resolution camera feed may be sufficient to enable a teleoperations system operator to discern what is going on.

The camera feeds 432 may be fed through a deserialization block 436 and then to a downsampling and compression block 438 that dynamically optimizes the camera feeds based upon available bandwidth as well as context data. Block 440 then performs uplink processing to manage data prioritization between the camera feeds and the other teleoperations session data. While various methodologies may be used in different implementations, block 440 may, in general, prioritize perception and motion planning data or camera depending upon the situation. The priority may be controlled by a teleoperations system or by a vehicle in different implementations. A time sensitive networking block 442 then manages the communication of the session data over modem 444, from which the session data is streamed to the teleoperations system.

Downsampling and compression block 438 may perform dynamic camera feed optimization as described herein by first, in block 446, selecting a primary camera feed based upon the vehicle's context. The primary camera feed may, as noted above, may be selected based upon which, among the available camera feeds, provides the best situational awareness for a teleoperations system operator given the current context of the vehicle. Block 448 then selects a video quality for one or more cameras based upon the context, e.g., to reduce the quality for any camera feeds that are less relevant to decision(s) being tasked to the teleoperations system operator. The quality, in this regard, may include any number of video parameters that control the amount of detail from a camera feed that is ultimately presented to a teleoperations system operator, including one or more of resolution, frame rate, field of view, zoom, color depth, compression level, etc., with the understanding that variances in any of such video parameters that result in lower quality are often accompanied by lower required bandwidth to communicate over a network connection.

As such, once a primary camera feed is selected and a quality is selected for one or more camera feeds, block 450 downsamples and compresses the camera feeds based upon the decisions made in blocks 446 and 448 to optimize the camera feeds for communication to the teleoperations system.

Figure 10:
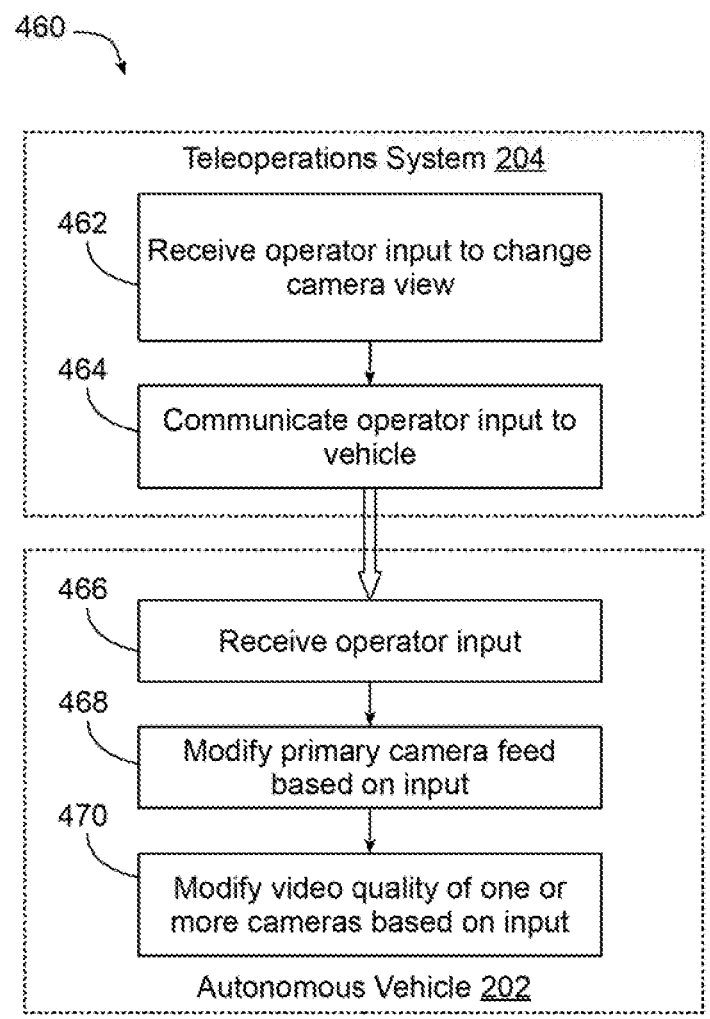
FIG. 10 is a flowchart illustrating an example sequence of operations for changing a camera view in the system of FIGS. 2-3.

It should also be appreciated that it may also be desirable in some implementations to enable a teleoperations system operator to also provide input to control the camera feeds being streamed by the autonomous vehicle. FIG. 10, for example, illustrates an example sequence of operations 460 for changing a camera view presented to the operator during a teleoperations session. In block 462, an operator may generate user input to teleoperations system 204 to change a camera view. In the display of FIG. 5, for example, an operator may select any of camera feeds 322-328 by touching or clicking on one of such feeds in order to cause that feed to be displayed in the enlarged display 330. In other implementations, an operator may request a different camera feed, or a different quality of camera feed, via other user interface controls. For example, an operator may request a higher or lower resolution, a change in zoom or a change in field of view in some implementations.

Next, once the user input is received, teleoperations system 204 may communicate the operator input to vehicle 202 in block 464, and the vehicle, in block 466 may receive that operator input. Then, based upon the operator input, vehicle 202 may modify the primary camera feed in block 468 and/or modify the video quality of one or more of the cameras in block 470. Subsequent camera feed optimization may then be modified based upon the operator input.

Other variations will be apparent to those of ordinary skill. Therefore, the invention lies in the claims hereinafter appended.

What is claimed is:

1. A method, comprising:
   detecting a condition with a detector in an autonomous vehicle operating in an environment, wherein the detector comprises a trained machine learning model corresponding to an indecision detector configured to detect a condition where the vehicle is unable to determine any suitable paths forward or a rider request detector configured to detect when an individual is attempting to hail the autonomous vehicle;
   communicating a notification of the detected condition to a teleoperations system in communication with and remote from the autonomous vehicle;
   communicating to the teleoperations system context data collected by the autonomous vehicle from the environment in which the autonomous vehicle is operating and from which the detected condition may be verified by the teleoperations system;
   receiving from the teleoperations system an override command initiated in response to an inability to verify the detected condition;
   ignoring the detected condition in the autonomous vehicle in response to the received override command; and
   generating training data for the detector in response to the received override command.

2. The method of claim 1, wherein ignoring the detected condition in the autonomous vehicle includes operating the autonomous vehicle as if the condition was not or is not detected.

3. The method of claim 1, wherein the detector is a high recall detector biased to reduce false negative detections and increase a likelihood of false positive detections, and wherein the teleoperations system is configured to identify false positive detections by the detector.

4. The method of claim 1, wherein the detector is resident in a perception component of the autonomous vehicle.

5. The method of claim 1, wherein the detector is a first detector and the condition is a first condition, wherein the method further comprises detecting a second condition with a second detector in the autonomous vehicle, and wherein the second detector comprises a construction detector configured to detect a lane blockage, lane construction, a temporary traffic control device, or an authority directing traffic.

6. The method of claim 1, wherein the detector is a first detector and the condition is a first condition, wherein the method further comprises detecting a second condition with a second detector in the autonomous vehicle, and wherein the second detector comprises an emergency vehicle detector configured to detect an emergency vehicle responding to an emergency situation, a school bus detector configured to detect a school bus with an extended stop arm, or a funeral procession detector configured to detect a funeral procession.

7. The method of claim 1, wherein the detector is a first detector and the condition is a first condition, wherein the method further comprises detecting a second condition with a second detector in the autonomous vehicle, and wherein the second detector comprises a map change detector configured to detect a change in sensed data relative to mapping data.

8. The method of claim 1, wherein communicating the context data to the teleoperations system includes communicating autonomy, sensor, telemetry and/or video data to the teleoperations system.

9. A method, comprising:
   in a teleoperations system in communication with an autonomous vehicle operating in an environment and remote from the teleoperations system, receiving from the autonomous vehicle a notification of a condition detected by a detector of the autonomous vehicle, wherein the detector comprises a trained machine learning model corresponding to a funeral procession detector configured to detect a funeral procession;

in the teleoperations system, presenting to a teleoperations system operator context data collected by the autonomous vehicle from the environment in which the autonomous vehicle operates and from which the detected condition may be verified;

in the teleoperations system, receiving an override command from the teleoperations system operator based upon an inability by the teleoperations system operator to verify the detected condition;

communicating the override command to the autonomous vehicle to enable the autonomous vehicle to ignore the detected condition; and generating training data for the detector in response to the received override command.

10. The method of claim 9, wherein communicating the override command to the autonomous vehicle to enable the autonomous vehicle to ignore the detected condition enables the autonomous vehicle to operate as if the condition was not or is not detected.

11. The method of claim 9, wherein the detector is a high recall detector biased to reduce false negative detections and increase a likelihood of false positive detections, and wherein the override command indicates that the teleoperations system operator has identified a false positive detection by the detector.

12. The method of claim 9, wherein presenting the context data to the teleoperations system operator includes generating a user interface that represents at least a portion of the context data and that includes a user interface control that is actuatable by the teleoperations system operator to generate the override command.

13. The method of claim 12, wherein the user interface control comprises a slider control.

14. The method of claim 9, further comprising notifying another autonomous vehicle in response to receiving the override command to enable the other autonomous vehicle to ignore a detected condition detected by a detector of the other autonomous vehicle.

15. An autonomous vehicle control system, comprising:
a computer readable storage medium;
a detector configured to detect a condition in an autonomous vehicle operating in an environment, wherein the detector comprises a trained machine learning model corresponding to a funeral procession detector configured to detect a funeral procession; and
computer instructions resident in the computer readable storage medium and executable by the one or more processors to:
communicate a notification of the detected condition to a teleoperations system in communication with and remote from the autonomous vehicle;
communicate to the teleoperations system context data collected by the autonomous vehicle from the environment in which the autonomous vehicle operates and from which the detected condition may be verified by the teleoperations system;
receive from the teleoperations system an override command initiated in response to an inability to verify the detected condition;
ignore the detected condition in the autonomous vehicle in response to the received override command; and
generate training data for the detector in response to the received override command.

16. The autonomous vehicle control system of claim 15, wherein the computer instructions are configured to ignore the detected condition in the autonomous vehicle by operating the autonomous vehicle as if the condition was not or is not detected.

17. An apparatus remote from and in wireless communication with an autonomous vehicle operating in an environment, the apparatus comprising:
a computer readable storage medium;
one or more processors coupled to the memory; and
computer instructions resident in the computer readable storage medium and executable by the one or more processors to:
receive from the autonomous vehicle a notification of a condition detected by a detector of the autonomous vehicle, wherein the detector comprises a trained machine learning model corresponding to an indecision detector configured to detect a condition where the vehicle is unable to determine any suitable paths forward or a rider request detector configured to detect when an individual is attempting to hail the autonomous vehicle;
present to a teleoperations system operator context data collected by the autonomous vehicle from the environment in which the autonomous vehicle operates and from which the detected condition may be verified;
receive an override command from the teleoperations system operator based upon an inability by the teleoperations system operator to verify the detected condition;
communicate the override command to the autonomous vehicle to enable the autonomous vehicle to ignore the detected condition; and
generate training data for the detector in response to the received override command.

18. The apparatus of claim 17, wherein communicating the override command to the autonomous vehicle to enable the autonomous vehicle to ignore the detected condition enables the autonomous vehicle to operate as if the condition was not or is not detected.

* * * * *